(12) United States Patent
Chou

(10) Patent No.: US 6,729,055 B2
(45) Date of Patent: May 4, 2004

(54) SHORT DISTANCE REFLECTED PATTERN DECORATING PLATE

(76) Inventor: Chin-Hsing Chou, No. 131, Xing Dong St., Liu Jia Shiang, Tainan Hsien (TW)

( * ) Notice: Subject to any disclaimer, the term of this patent is extended or adjusted under 35 U.S.C. 154(b) by 69 days.

(21) Appl. No.: 10/165,957

(22) Filed: Jun. 11, 2002

(65) Prior Publication Data

US 2003/0226299 A1 Dec. 11, 2003

(51) Int. Cl.$^7$ .............................................. G09F 13/18
(52) U.S. Cl. ............................ 40/546; 40/591; 40/911; 362/487; 362/496
(58) Field of Search ...................... 40/546, 556, 580, 40/591, 911; 362/487, 496

(56) References Cited

U.S. PATENT DOCUMENTS

| | | | | | |
|---|---|---|---|---|---|
| 1,499,688 | A | * | 7/1924 | Palmer et al. | 40/546 |
| 4,443,832 | A | * | 4/1984 | Kanamori et al. | 362/487 |
| 4,965,950 | A | * | 10/1990 | Yamada | 40/546 |
| 4,977,695 | A | * | 12/1990 | Armbruster | 40/541 |
| 5,604,480 | A | * | 2/1997 | Lamparter | 362/478 |
| 6,190,026 | B1 | * | 2/2001 | Moore | 362/487 |
| 2002/0105812 | A1 | * | 8/2002 | Zimmerman et al. | 362/487 |

* cited by examiner

*Primary Examiner*—Gary Hoge
(74) *Attorney, Agent, or Firm*—Rosenberg, Klein & Lee

(57) ABSTRACT

A short distance reflected pattern decorating plate that compromises a base, a decorating plate, a front plate and a circuit board that makes the decorating plate brighter and clearer, and to emphasize the decorating plate with a bright light circle.

4 Claims, 6 Drawing Sheets

SHORT DISTANCE REFLECTED PATTERN DECORATING PLATE

BACKGROUND OF THE INVENTION (1). Field of the Invention

This invention relates generally to a short distance reflected pattern decorating plate and, more specifically, to a short distance reflected pattern decorating plate that compromising a base, a decorating plate, a front plate and a circuit board that makes the decorating plate brighter and clearer, and to emphasize the decorating plate with a bright light circle (2). Description of the Prior Art Heretofore, it is known that an emblem of the automobile indicates the manufacturer, the emblems are on both the front engine hood and back of the trunk, such arrangement is not only clearly indicates the manufacturer but also becomes a beautiful decorating plate. Most of the known emblems are a fixed size plate with sculpture on one side; however such mechanism is very simple and dull and not able to act as a decorating plate.

A different mechanism, shown in FIG. 6, is made of a cold light plate that further consists of a front plate (A), an illuminator (B), and a base (C). A transparent display portion (A1) is on the front plate (A) and can be in any shape, the illuminator (B) is a cold light plate with light evenly displayed on surface. The base (C) holds the illuminator (B) and then to have the front plate (A) covers both of them, finally joins them together with wave soldering to form them into a strong body. The illuminator (B) emits light and the transparent display portion (A1) of the front plate (A) displays the desired pattern.

The effect of above mechanism is better than previous one, however such mechanism applies illuminator emitting cold light evenly and the transparent display portion of the front plate displaying the desired pattern. The soft and even light displayed by the transparent display portion is from bottom; the effect is no so three-dimensional to be a good decorating plate. The cold light plate fads away easily after long-term sun exposure, that results poor decorative effect.

A different mechanism similar to the above one is to have several light bulbs inside the base. The light bulbs inject light directly to the transparent display portion for the desired pattern. However the display portion is transparent, therefore the bulbs can be seen regardless they are on or off, such design might not be so elegant. If those bulbs are to be hidden, the transparent display portion must be modified to be translucent, such design might dim the light that causes the pattern is not so bright and not so decorative.

SUMMARY OF THE INVENTION

It is therefore a primary object of the invention to provide a short distance reflected pattern decorating plate to make the decorating plate brighter and clearer, and to emphasize the decorating plate with a bright light circle.

In order to achieve the objective set forth, a short distance reflected pattern decorating plate in accordance with the present invention comprises a bas, a decorating plate, a front plate and a circuit board. The base further consists of a recess according to the shape of the decorating plate, the surface of the recess is electroplated to form a reflection layer; several illuminator holes span over the recess to locate the illuminators. The decorating plate is a transparent plate and shaped according to the recess of the base; a reflection side is formed on the sloped contacting area with the recess of the base; a refraction side with many vertical cuts is formed along the inclined circumference of the decorating plate. The front plate is made of a transparent acrylic board with darken surface, a transparent display portion is shaped according to the decorating plate. The circuit board is an electrical system board on the base, several illuminators, such as light bulbs or light emitting diodes are installed inside the illuminator holes of the base.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
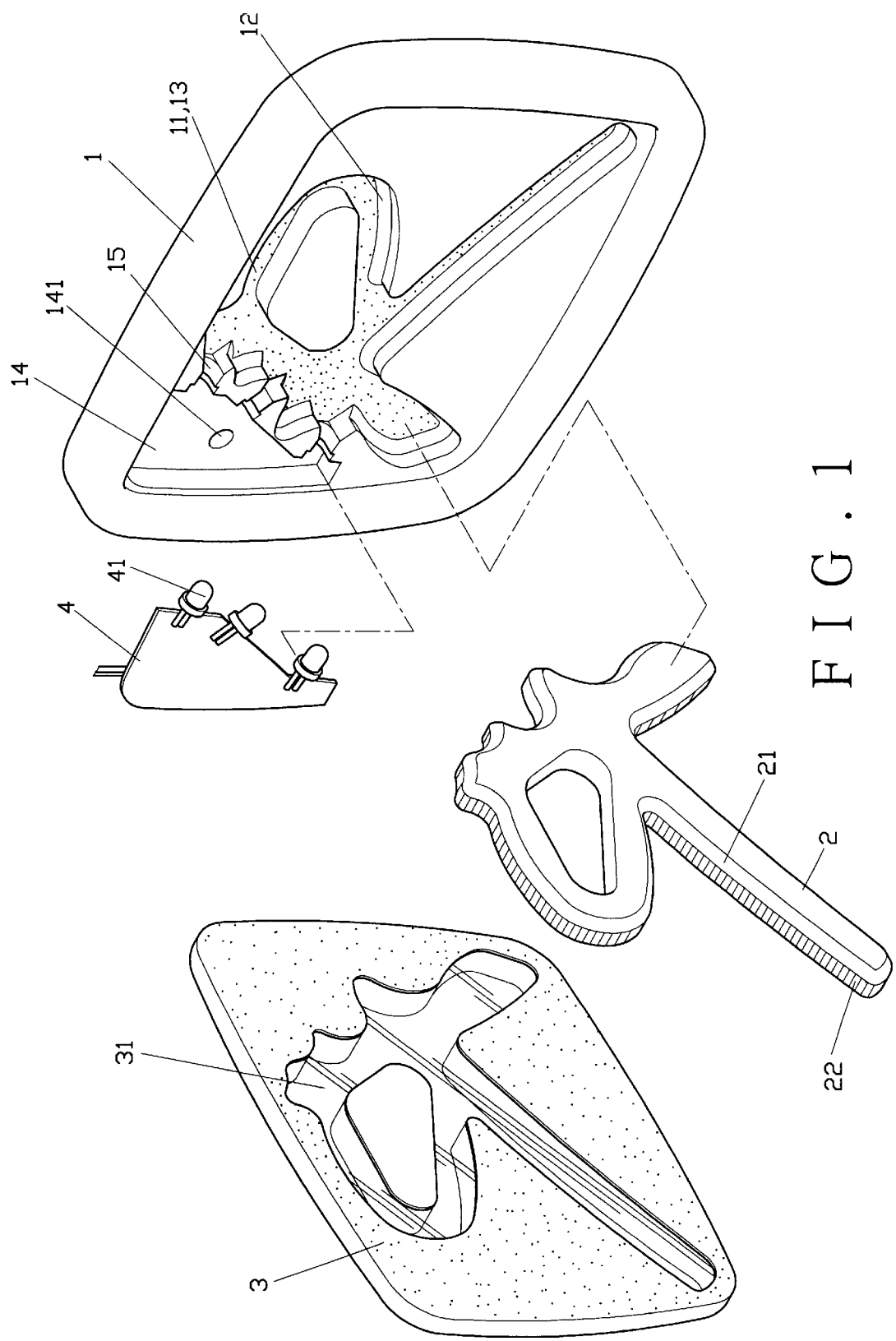
FIG. 1 is an exploded view of the present invention.
Figure 2:
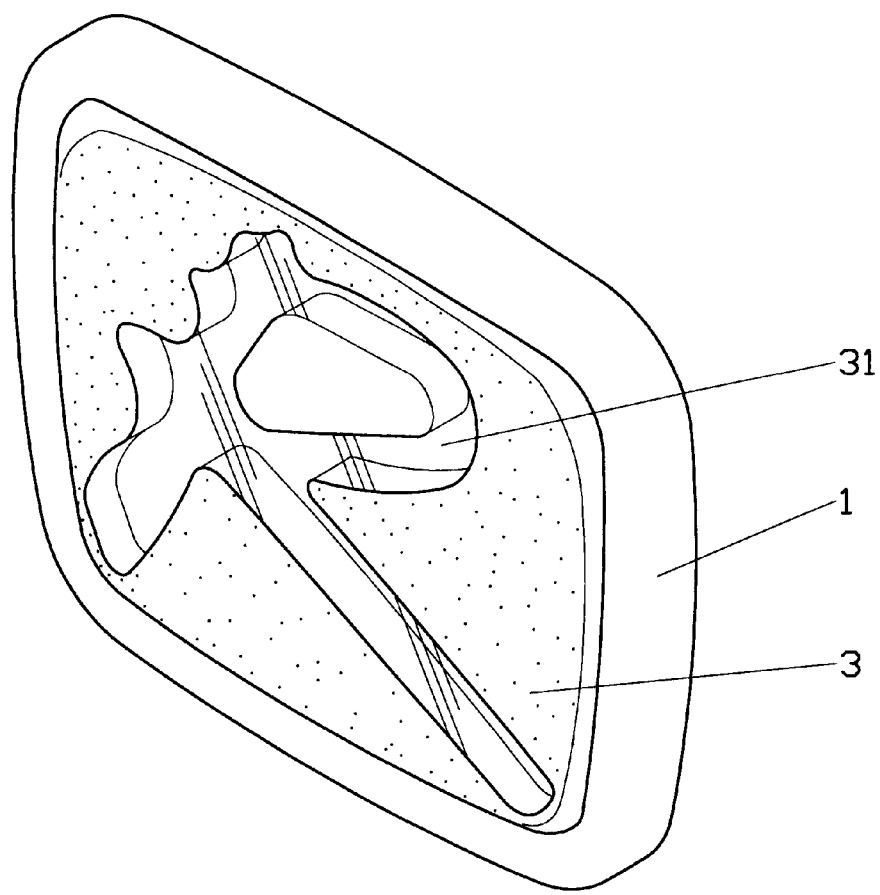
FIG. 2 is an assembly view of the present invention.

Referring to FIG. 1 and FIG. 2, the present invention is composed of a base (1), a decorating plate (2), a front plate (3) and a circuit board (4).

The base (1) further consists of a recess (11) according to the shape of the decorating plate (2), along the bottom of the recess (11) forms a fitting interface (12), the surface of the recess (11) is electroplated to form a reflection layer (13); a trough (14) is beside the recess (11), a through hole (141) is on the trough (14); a plurality of illuminator holes (15) span over the recess (11) and the trough (14), the locations and directions of the illuminator holes (15) depend on the configuration of the recess (11).

The decorating plate (2) is a transparent plate and shaped according to the recess (11) of the base (1); a reflection side (21) is formed on the sloped contacting area with the recess (11) of the base (1); a refraction side (22) with many vertical cuts is formed along the inclined circumference of the decorating plate (2).

The front plate (3) is made of a transparent acrylic board with darken surface, a transparent display portion (31) is shaped according to the decorating plate (2).

The circuit board (4) is connected to an electrical system and provides a plurality of illuminators (41), such as light bulbs or light emitting diodes at the edge according to the location of the illuminator holes (15) of the base (1).

Figure 3:
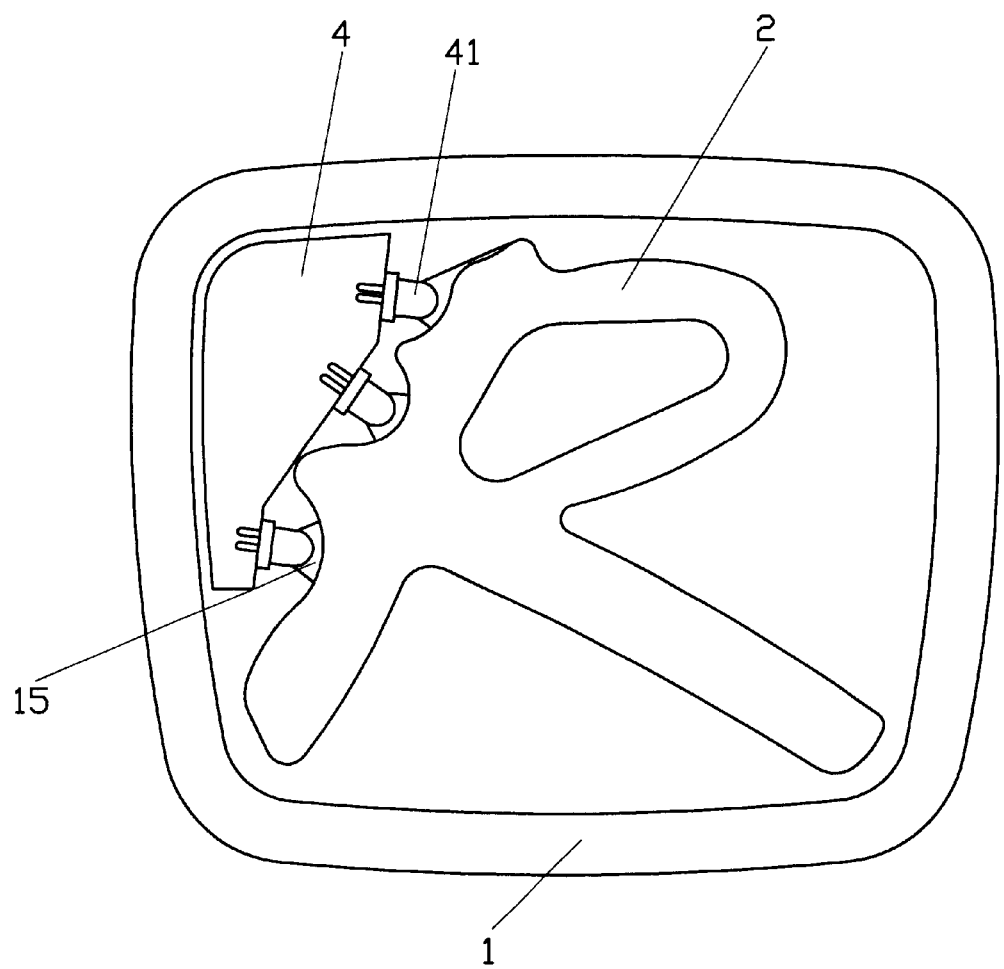
FIG. 3 is a front view of the present invention, without the front board.

While assemble above components together, as shown in FIG. 2 and FIG. 3, the circuit board (4) is placed into the trough (14) of the base (1), each of the illuminators (41) of the circuit board (4) is placed inside the respective illuminator hole (15), the power wires of the circuit board (4) go through the through hole (141) of the base (1) and are connect to the power system. The decorating plate (2) is placed into the corresponding recess (11); the front plate (3) and the base (1) are wave-soldered together, that further fixes the decorating plate (2) firmly on the base (1). The circuit board (4) and the illuminators (41) are on one side of the base (1), they can be covered by the darken front plate (3), only the transparent display portion (31) exposes the decorating plate (2), therefore whether the illuminators (41) are on or off, both the circuit board (4) and the illuminators (41) are not seen, such design is applicable to automobile emblems or signboards.

Figure 4:
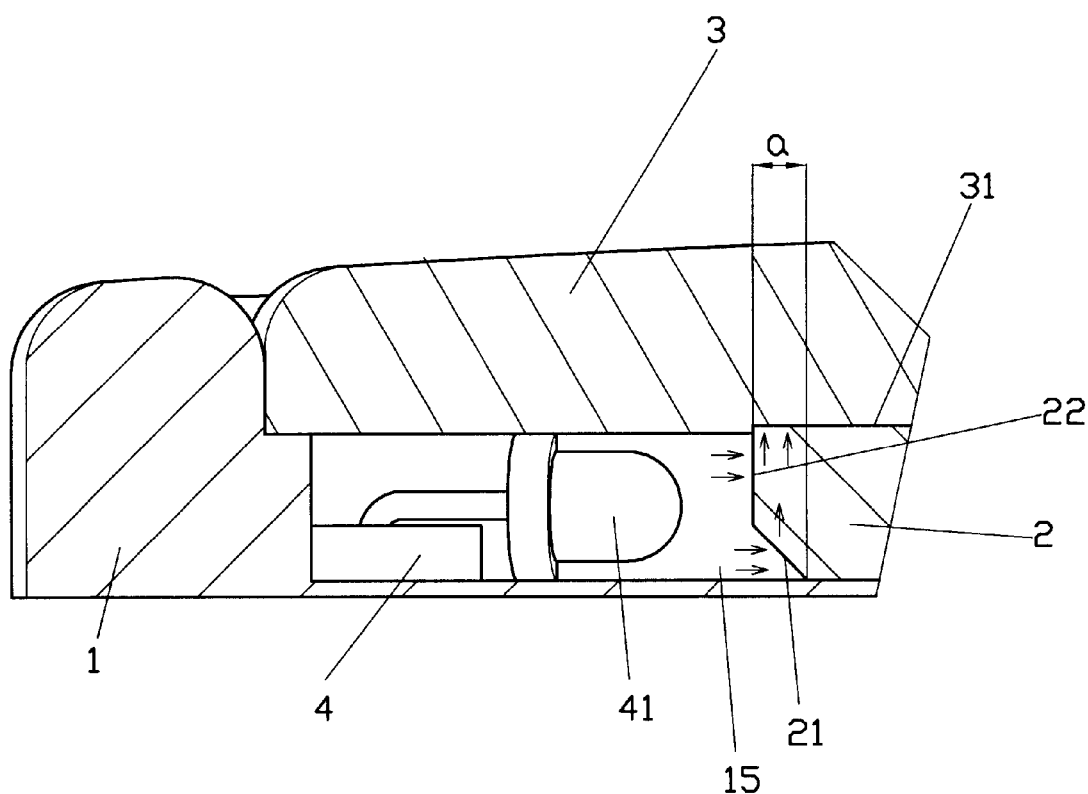
FIG. 4 is a light refraction path of the present invention.

The illuminators (41) of the circuit board (4) emit the light from the illuminator holes (15) to the circumference of the decorating plate (2), since circumference of the decorating plate (2) is equipped with the reflection side (21) and refraction side (22) both with different reflecting angles, therefore when the illuminators (41) are on, as shown in FIG. 4, light is reflected from the reflection side (21) and the refraction side (22), that makes the surface of the decorating plate (2) form a very bright light circle; the width of the light circle is about the size of the reflection side (21) "a". Since the refraction side (22) has vertical cuts along the circumference that subdivide the refraction side (22) into many small light-condensing areas to condense light along the decorating plate (2), such can makes the light circle of the decorating plate (2) brighter and the outline of the decorating plate (2) clearer. The decorating plate (2) is made of a transparent plate; light can pass through and be condensed by the reflection layer (13) of the recess (11) on the base (1), and then reflected to the surface of the decorating plate (2) to form even and soft light, such effect makes a very strong contrast with the bright light along the decorating plate (2), and further makes the transparent display portion (31) of the front plate (3) form a bright pattern.

Another application example, the decorating plate (2) can also be electroplated as a reflecting layer on the bottom that contacts the base (1), when the illuminators (41) emit light, the reflection side (21) and the refraction side (22) on the circumference of the decorating plate (2) reflect light back to the circumference of the decorating plate (2) and form a very bright light circle, the reflecting layer of the electroplated bottom of the decorating plate (2) condenses light that can also have the whole decorating plate (2) show evenly bright light. The shapes of the decorating plate (2), the recess (11) of the base (1) and the transparent display portion (31) of the front plate (3) can be configured as desired, the locations of the illuminator holes (15) can be adjusted according to the shape of the decorating plate (2) to have the circumference of the decorating plate (2) show very bright light circle and distinctly display the whole outline, such scheme can clearly present characters or patterns to achieve a very good advertisement or decorative effect.

Figure 5:
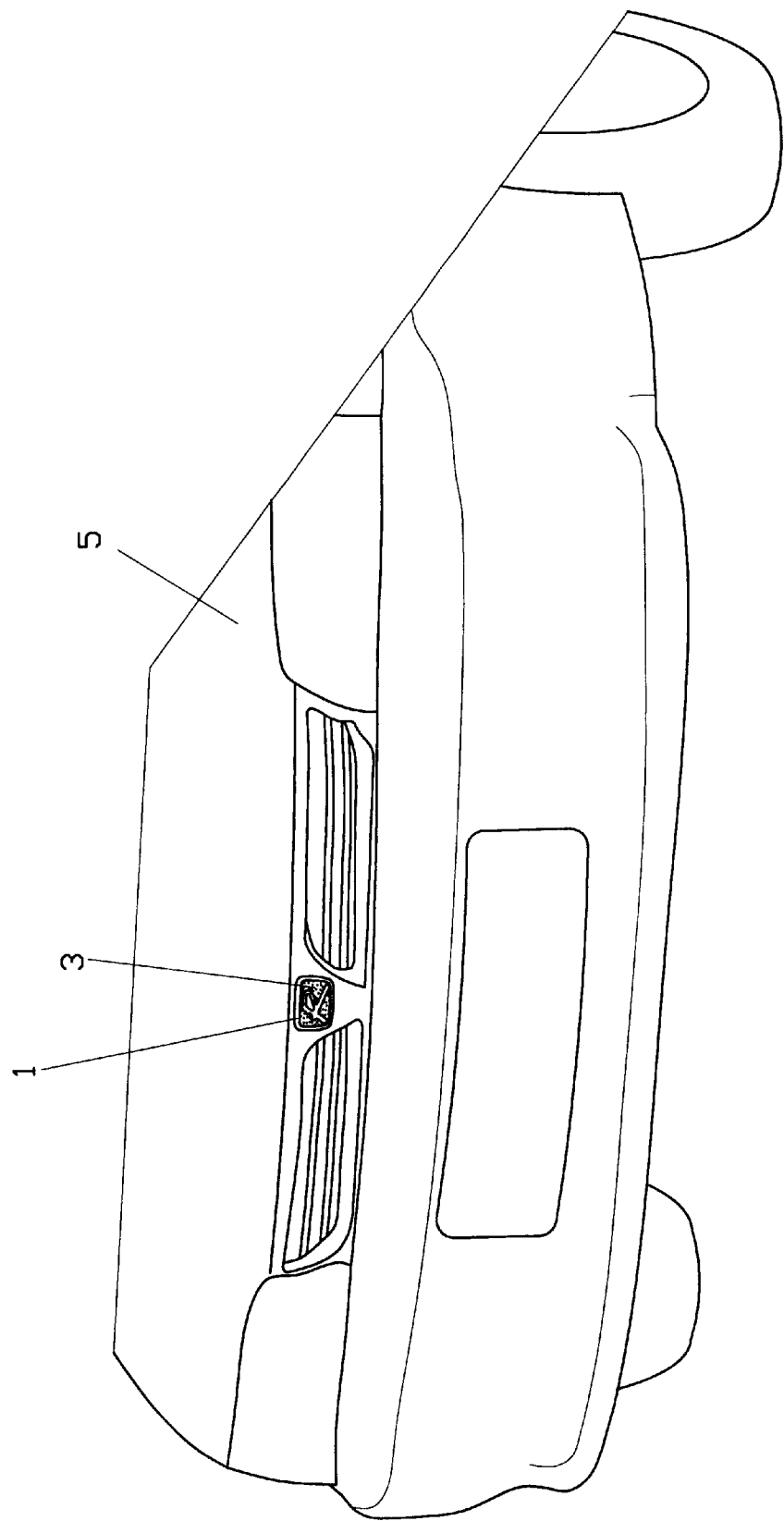
FIG. 5 is an application example of the present invention.
Figure 6:
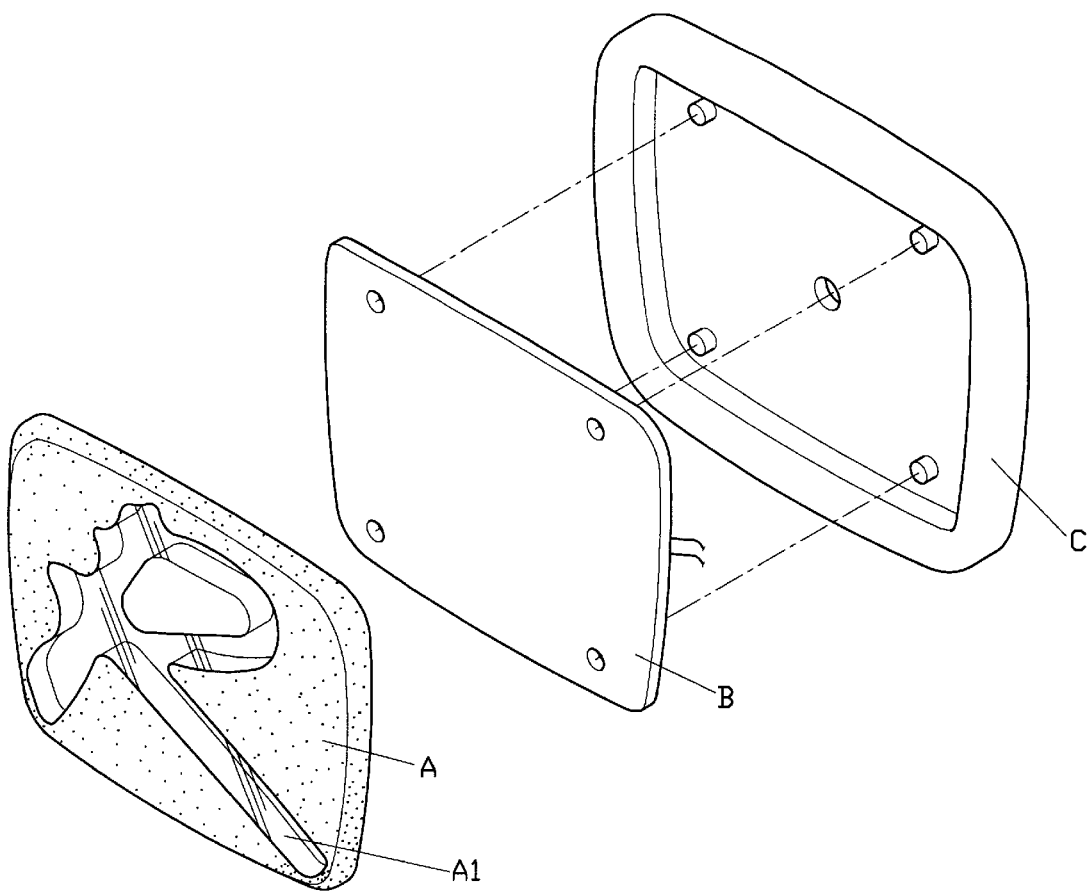
FIG. 6 is an exploded view of a prior art.

While as an emblem of an automotive, as shown in FIG. 5, the present invention can be glued on the front, back or other remarkable locations of an automotive (5), the power wires of the circuit board (4) can be connect to the power system; when the front lamps are on, the electrical power system also offers power to the circuit board (4) and turns the illuminators (41) to emit light on the reflection side (21) and the refraction side (22) of the decorating plate (2) to form a bright pattern.

General signboards and signs can also apply the same scheme to have the illuminators (41) emit light to the decorating plate (2), then have the transparent display portion (31) of the front plate (3) display the image of the decorating plate (2).

While a preferred embodiment of the invention has been shown and described in detail, it will be readily understood and appreciated that numerous omissions, changes and additions may be made without departing from the spirit and scope of the invention.

What is claimed is:

1. A short distance reflected pattern decorating plate comprising:
   a base having (a) a recess formed therein, (b) a trough disposed adjacent said recess, (c) a through hole formed in said trough, and (d) a plurality of illuminator holes extending between said recess and said trough;
   a decorating plate made of a transparent plate and having a shape corresponding to said recess of said base, said decorating plate having a reflection side formed on a sloped portion thereof that forms a contacting area with said recess of said base, said decorating plate having a refraction side formed along an inclined circumference thereof;
   a front plate made of a transparent acrylic board with a darkened surface, said front plate having a transparent display portion being shaped in correspondence to said decorating plate; and,
   a circuit board being an electrical system board disposed in said trough of said base, said circuit board having a plurality of illuminators mounted thereon and respectively, installed inside said illuminator holes of said base.

2. The short distance reflected pattern decorating plate recited in claim 1, further comprising a reflecting layer disposed between adjacent surfaces of said decorating plate and said recess of said base.

3. The short distance reflected pattern decorating plate recited in claim 2, wherein said reflecting layer is electroplated on a surface of said recess.

4. The short distance reflected pattern decorating plate recited in claim 1, wherein said refraction side has a plurality of vertical cuts formed along the inclined circumference of said decorating plate.

\* \* \* \* \*